(12) United States Patent
Kitajima et al.

(10) Patent No.: US 10,926,207 B2
(45) Date of Patent: Feb. 23, 2021

(54) FILTER DEVICE

(71) Applicant: YAMASHIN-FILTER CORP., Kanagawa (JP)

(72) Inventors: Nobuyuki Kitajima, Kanagawa (JP); Nobuki Sasaki, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 0 days.

(21) Appl. No.: 16/198,922

(22) Filed: Nov. 23, 2018

(65) Prior Publication Data

US 2019/0091614 A1 Mar. 28, 2019

Related U.S. Application Data

(63) Continuation of application No. PCT/JP2017/019923, filed on May 29, 2017.

(30) Foreign Application Priority Data

Jun. 3, 2016 (JP) .............................. JP2016-112038

(51) Int. Cl.
*B01D 19/00* (2006.01)
*B01D 36/00* (2006.01)
(Continued)

(52) U.S. Cl.
CPC ........... *B01D 36/001* (2013.01); *B01D 19/00* (2013.01); *B01D 19/0057* (2013.01);
(Continued)

(58) Field of Classification Search
CPC .. B01D 19/00; B01D 19/0057; B01D 29/232; B01D 35/027; B01D 36/00; B01D 36/001; B01D 46/0039–005
(Continued)

(56) References Cited

U.S. PATENT DOCUMENTS 2,811,220 A 10/1957 Winslow
3,788,044 A * 1/1974 McNeil .................... B01D 3/06
96/209
(Continued)

FOREIGN PATENT DOCUMENTS

CN 2279200 Y 4/1998
CN 1459575 A 12/2003
(Continued)

OTHER PUBLICATIONS

International Search Report issued in PCT/JP2017/019923 dated Aug. 8, 2017 with English Translation (5 pages).
(Continued)

*Primary Examiner* — T. Bennett McKenzie
(74) *Attorney, Agent, or Firm* — Nakanishi IP Associates, LLC (57) ABSTRACT

When a liquid flows into a case along a tangential direction at an arbitrary point on a side surface of a filter case from an inflow pipe provided substantially around an outer periphery, at the side surface of the filter case, a swirling flow is produced in the liquid flowed and air contained in a fluid is collected in a center portion of the swirling flow to generate bubbles. The inflow pipe and a filter element are positioned not to overlap each other in a height direction, whereby the liquid flows into a hollow portion of a filter element from a case while swirling. The bubbles generated in the center portion of the swirling flow are released to a space above a liquid surface of the fluid retained in a tank through an air outlet portion formed in an upper end surface or the side surface of the filter case.

8 Claims, 10 Drawing Sheets

(51) Int. Cl.
    *B01D 29/90*     (2006.01)
    *B01D 35/147*     (2006.01)
    *B01D 29/23*     (2006.01)
    *B01D 29/58*     (2006.01)
    *B01D 35/027*     (2006.01)

(52) U.S. Cl.
    CPC ........... *B01D 29/23* (2013.01); *B01D 29/232* (2013.01); *B01D 29/58* (2013.01); *B01D 29/906* (2013.01); *B01D 29/908* (2013.01); *B01D 35/027* (2013.01); *B01D 35/0276* (2013.01); *B01D 35/147* (2013.01)

(58) Field of Classification Search
    USPC ........................ 96/209; 210/787–789; 55/337
    See application file for complete search history.

(56) References Cited

U.S. PATENT DOCUMENTS

| | | | |
|---|---|---|---|
| 4,707,165 A | 11/1987 | Tauber et al. | |
| 4,865,632 A * | 9/1989 | Yano | B01D 19/0057 |
| | | | 96/212 |
| 4,878,924 A * | 11/1989 | Yano | B01D 19/0057 |
| | | | 96/212 |
| 2003/0233942 A1 | 12/2003 | Konishi et al. | |
| 2007/0163442 A1 * | 7/2007 | Saito | B01D 19/0057 |
| | | | 96/209 |
| 2011/0056875 A1 | 3/2011 | Stehle et al. | |
| 2012/0091047 A1 | 4/2012 | Renner et al. | |

FOREIGN PATENT DOCUMENTS

| | | |
|---|---|---|
| DE | 102007054901 A1 | 5/2009 |
| DE | 102008012521 A1 | 9/2009 |
| JP | S56-89001 U1 | 7/1981 |
| JP | S61-257215 A | 11/1986 |
| JP | H1-104315 A | 4/1989 |
| JP | 2002-195217 A | 7/2002 |
| JP | 2009-6210 A | 1/2009 |
| WO | 2009/109212 A1 | 9/2009 |

OTHER PUBLICATIONS

Extended European Search Report issued in European Patent Application No. 17806609.8, dated Apr. 18, 2019 (8 pages).
Office Action issued in Chinese Patent Application No. 201780026562.5 dated Sep. 30, 2020 with an English translation (19 pages).

* cited by examiner

FILTER DEVICE

CROSS-REFERENCE TO RELATED APPLICATIONS

This application is a continuation application of International Patent Application No. PCT/JP2017/019923 filed on May 29, 2017, which claims priority to Japanese Patent Application No. 2016-112038 filed on Jun. 3, 2016, the entire contents of which are incorporated by reference.

TECHNICAL FIELD

The present invention relates to a filter device.

BACKGROUND ART

Patent Document 1 describes a filter device provided in a liquid storage tank. In this device, a fluid flows through a filtration material from the inside to the outside into a space between the filtration material and a casing, and then flows out from a passage opening portion formed in the casing to the liquid storage tank. Also, Patent Document 1 describes that a mesh portion is provided at the passage opening portion of the casing and bubbles contained in a liquid flowing out to the liquid storage tank are collected at the mesh portion and released upward.

CITATION LIST

Patent Document

Patent Document 1: DE 102008012521 A Specification

However, according to the disclosure of Patent Document 1, there is a possibility that bubbles that have not been collected at the mesh portion are released into the liquid retained in the liquid storage tank and fed to a pump via a strainer. In order to avoid such a situation that the bubbles are fed to the pump, it is desired to prevent the bubbles from being released inside the liquid storage tank.

The present invention was made in view of such circumstances, and therefore an object of the present invention is to provide a filter device capable of removing bubbles contained in a hydraulic oil before filtering of the hydraulic oil and of ensuring that the bubbles removed are not released inside a liquid retained in a hydraulic oil tank.

SUMMARY OF INVENTION

In one or more embodiments of the present invention, a filter device provided inside a tank includes: a filter case having a substantially cylindrical shape and covered at both ends; a filter element provided inside the filter case and including a filtration material having a substantially cylindrical shape, a first plate covering an upper end of the filtration material, and a second plate covering a lower end of the filtration material; a bubble removing portion including an inner case provided inside the filter case and an inflow pipe provided at a side surface of the filter case so as not to overlap the filter element in a height direction and so as to overlap the inner case in the height direction, provided substantially around an outer periphery of the filter case, and configured to cause a liquid to flow into the inner case along a tangential direction at an arbitrary point on the side surface of the filter case and to produce a swirling flow in the flowed liquid (e.g., configured substantially on a tangential line of an outer periphery of the filter case, so as to flow a liquid into the inner case and to produce a swirling flow in the flowed liquid in a circumferential direction along an inner peripheral surface of the inner case); and an air outlet portion formed in an upper end surface or the side surface of the filter case with a first end open to an inside of the filter case and a second end open to a space above a liquid surface of a fluid retained inside the tank. An opening is formed in the first plate or the second plate so as to cause the liquid to flow into a hollow portion of the filter element from the inner case. At the side surface of the filter case, a plurality of through holes in which a liquid having passed the filtration material flows out are formed. Air contained in the fluid is collected in a center portion of the swirling flow to generate bubbles, and the bubbles are released to a space above the liquid surface inside the tank through the air outlet portion.

According to one or more embodiments of the present invention, when a liquid flows into the inner case along a tangential direction at an arbitrary point on the side surface of the filter case from the inflow pipe provided substantially around the outer periphery, at the side surface of the filter case, a swirling flow is produced in the flowed liquid and the air contained in the fluid is collected in a center portion of the swirling flow to generate bubbles. The inflow pipe and the filter element are positioned not to overlap each other in the height direction, whereby the liquid flows into the hollow portion of the filter element from the inner case while swirling. The bubbles generated in the center portion of the swirling flow are released to a space above the liquid surface of the fluid retained inside the tank through the air outlet portion formed in the upper end surface or the side surface of the filter case. This structure makes it possible to remove bubbles contained in a hydraulic oil before filtering the hydraulic oil and ensure that the bubbles removed are not released inside the liquid retained in the hydraulic oil tank.

In one or more embodiments of the present invention, a filter device provided inside a tank includes: a filter case having a substantially cylindrical shape and covered at both ends; a filter element provided inside the filter case and including a filtration material having a substantially cylindrical shape, a first plate covering an upper end of the filtration material, and a second plate covering a lower end of the filtration material; a bubble removing portion including an inner case provided inside the filter case, an inflow pipe provided at a side surface of the filter case so as not to overlap the filter element in a height direction and so as to overlap the inner case in the height direction, and a rib provided inside the inner case so as to overlap the inflow pipe in the height direction and configured to cause a liquid having flowed inside of the filter case from the inflow pipe to flow along the rib to produce a swirling flow in the liquid; and an air outlet portion formed in an upper end surface or the side surface of the filter case with a first end open to an inside of the filter case and a second end open to a space above the liquid surface of a fluid retained inside the tank. An opening is formed in the first plate or the second plate so as to cause the liquid to flow into a hollow portion of the filter element from the inner case, at the side surface of the filter case. A plurality of through holes in which a liquid having passed the filtration material flows out are formed, the air contained in the fluid is collected in the center portion of the swirling flow to generate bubbles, and the bubbles are released to a space above the liquid surface inside the tank through the air outlet portion.

According to one or more embodiments of the present invention, a liquid having flowed into the inner case from the inflow pipe provided at the side surface of the filter case flows along the rib provided to overlap the inflow pipe in the height direction to produce a swirling flow, and the air contained in the fluid is collected in the center portion of the swirling flow to generate bubbles. The inflow pipe and the filter element are positioned not to overlap each other in the height direction and thus, the liquid flows into the hollow portion of the filter element from the inner case while swirling. The bubbles generated in the center portion of the swirling flow are released to a space above the liquid surface of the fluid retained inside the tank through the air outlet portion formed in the upper end surface or the side surface of the filter case. This structure makes it possible to remove bubbles contained in a hydraulic oil before filtering the hydraulic oil and ensure that the bubbles removed are not released inside the liquid retained in the hydraulic oil tank.

Here, the air outlet portion may be formed in the upper end surface of the filter case. This ensures that bubbles (air) that have come up to the oil surface in the liquid and disappeared at the oil surface can be spontaneously released to the outside of the filter case.

The filter device may include a bubble retaining portion provided inside the filter case and disposed on an upper side of the inflow pipe. The air outlet portion has the first end open to a lower side of the bubble retaining portion. With this structure, no bubbles pass the inside of a filter element 30A and thus, the possibility of bubbles B passing a filtration material 32 together with the hydraulic oil can be further reduced.

According to one or more embodiments of the present invention, bubbles contained in a hydraulic oil may be removed before filtering the hydraulic oil and the bubbles removed may not be released inside a liquid retained in a hydraulic oil tank.

DESCRIPTION OF EMBODIMENTS

Below, detailed descriptions of embodiments of the present invention will be given with reference to the drawings. The following embodiments discuss a return filter provided inside a hydraulic oil tank by way of example. Also, the return filter of the following embodiments is used to filter a hydraulic oil but a filter device of the present invention can be used to filter other fluids.

First Embodiment

Figure 1:
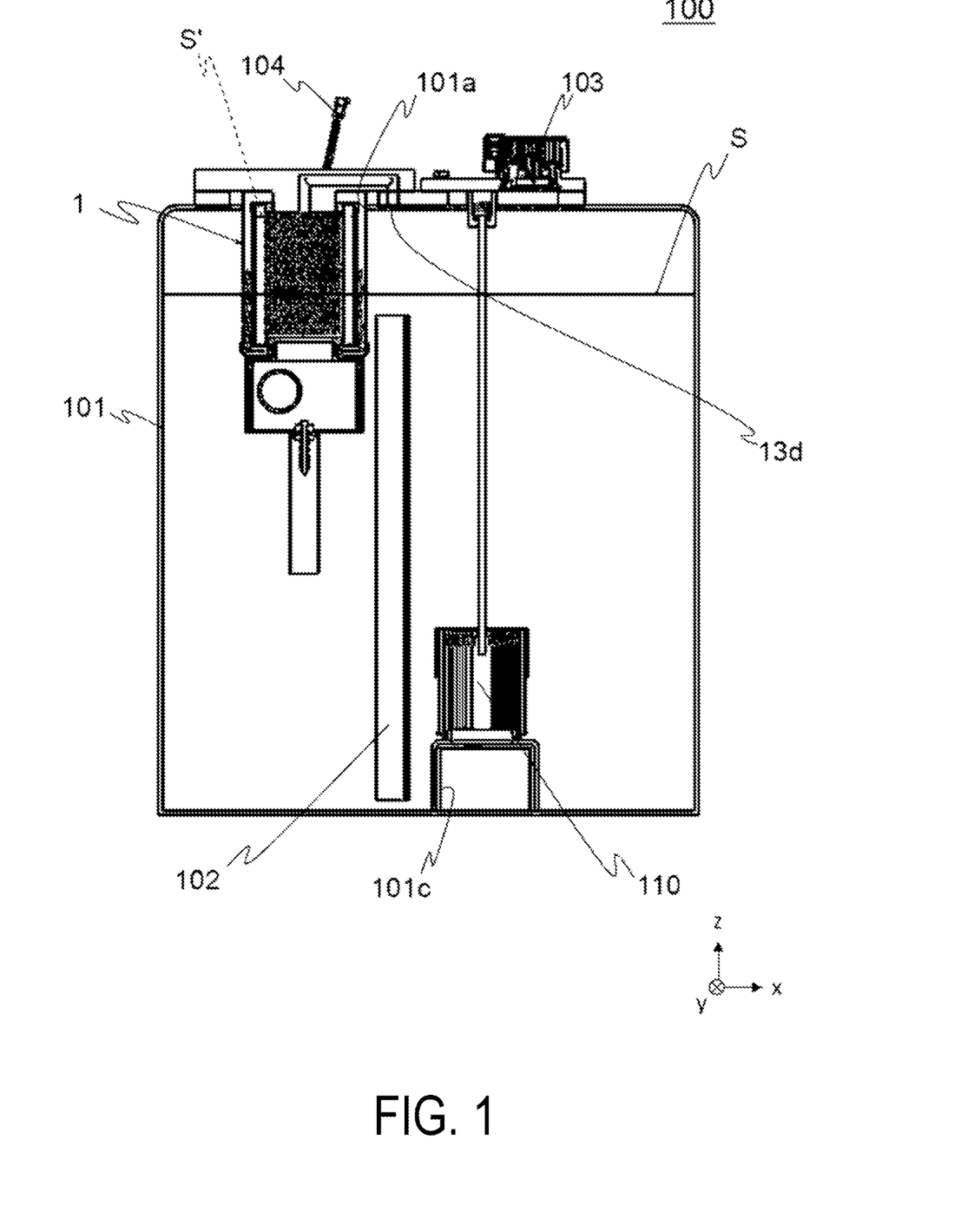
FIG. 1 is a diagram illustrating an overview of a hydraulic oil tank 100 provided, therein, with a return filter 1 according to an embodiment of the present invention.

FIG. 1 is a diagram illustrating an overview of a hydraulic oil tank 100 provided, therein, with a return filter 1 according to an embodiment of the present invention. In FIG. 1, main parts of the hydraulic oil tank 100 are illustrated from a perspective view.

The hydraulic oil tank 100 is installed in a work machine (a hydraulic apparatus, for example, not illustrated), and is disposed inside a hydraulic circuit of hydraulic oil supplied to the hydraulic apparatus and is configured to store the hydraulic oil. In the hydraulic circuit, the hydraulic oil passes through the hydraulic apparatus and is introduced into the hydraulic oil tank 100.

The hydraulic oil tank 100 includes a tank main body 101 having a box shape, for example, and this tank main body 101 has a hollow inside. The tank main body 101 primarily includes the return filter 1 and a suction strainer 110. A partition plate 102 that divides a space where the suction strainer 110 is provided and a space where the return filter 1 is provided inside the tank main body 101. Note that the partition plate 102 is not necessarily required.

An opening 101a used for maintenance of the return filter 1 and the like is formed on an upper surface of the tank main body 101. The return filter 1 is attached to the opening 101a.

Further, an air breather 103 that is configured to filter the air that enters the tank main body 101 in association with the vertical movement of an oil surface S and not to allow refuse or the like to enter the hydraulic oil, is provided to the upper surface of the tank main body 101.

An inflow port (not illustrated) configured to allow the hydraulic oil to flow into the tank main body 101 is formed on a side surface of the tank main body 101. An inflow pipe 21 (described later) of the return filter 1 is fitted into the inflow port. The hydraulic oil introduced into the return filter 1 via the inflow pipe 21 is configured to be filtered by the return filter 1 and stored in the hydraulic oil tank 100. Also, a differential pressure indicator 104 is provided at the inflow port so as to detect and display a difference between the internal pressure and the external pressure of the return filter 1. Note that the differential pressure indicator 104 is not necessarily required.

An outflow port 101c that allows the hydraulic oil inside the tank main body 101 to flow out to a hydraulic pump (not illustrated) is formed in a neighborhood of a lower end portion of the tank main body 101 (on a bottom surface of the tank main body 101 according to the present embodiment). A suction pipe (not illustrated) that leads to a suction port of the hydraulic pump (not illustrated) is fitted into the outflow port 101c.

To prevent foreign matter from entering the suction pipe, the suction strainer 110 is provided on an upper side of the outflow port 101c (inner side of the tank main body 101). The hydraulic oil stored in the hydraulic oil tank 100 is suctioned into the hydraulic pump (not illustrated), flows out to the suction pipe via the suction strainer 110, and is supplied once again to the hydraulic apparatus.

Figure 2:
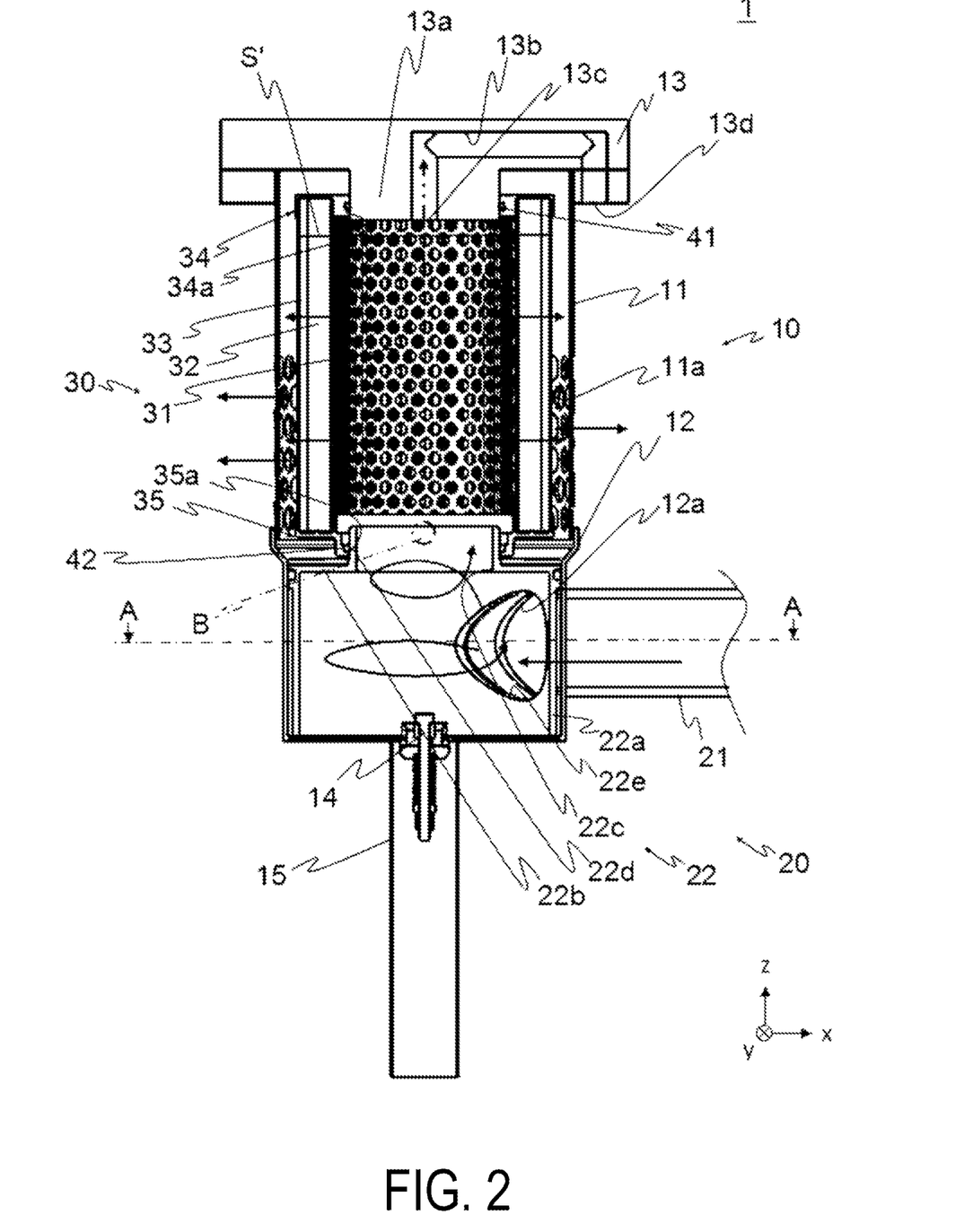
FIG. 2 is a cross-sectional view illustrating an overview of a return filter 1.

FIG. 2 is a cross-sectional view illustrating an overview of the return filter 1 (note that hatching indicating a cross section is omitted). The return filter 1 mainly includes a filter case 10, a bubble removing portion 20, and a filter element 30.

The filter case 10 is a member having a substantially cylindrical shape and covered at both ends and is formed from a material having high corrosion resistance (a metal such as stainless steel, or a resin, for example). The filter case 10 mainly includes a first case 11 having a substantially cylindrical shape, a second case 12 having a bottomed substantially cylindrical shape covering an opening on the bottom surface side (−z side) of the first case 11, and a lid body 13 (corresponding to an upper end surface).

At the side surface of the first case 11, a through hole 11a is formed, which allows the hydraulic oil to pass through. Further, the lid body 13 is provided at the first case 11 so as to cover an opening of an upper end (+z side end). The lid body 13 is provided, therein, with a tube portion 13a to be inserted into the internal space of the filter element 30 and an air outlet hole 13b (corresponding to an air outlet portion). The air outlet hole 13b has a first end 13c open to the inside of the filter element 30 and a second end 13d open to the hydraulic oil tank 100 (see FIG. 1). Hence, the air outlet hole 13b communicates between the internal space of the filter element 30 and an external space of the filter case 10 (i.e., the internal space of the hydraulic oil tank 100; see FIG. 1).

Bolt insertion holes are formed in a peripheral edge portion of the lid body 13. Bolts (not illustrated) inserted through the bolt insertion holes are screwed into bolt holes (not illustrated) of the tank main body 101, thereby tightening the return filter 1 to the tank main body 101.

At the side surface of the second case 12, an opening 12a in which an inflow pipe 21 (described in detail later) is provided, is formed. A valve 14 is provided at the bottom surface of the second case 12. The valve 14 is configured to open and close depending on a difference between the internal pressure and the external pressure of the filter case 10. Also, at the bottom surface of the second case 12, a cylindrical pipe 15 is provided so as to cover the valve 14. Note that the valve 14 and the cylindrical pipe 15 are not necessarily required.

The bubble removing portion 20 is formed from a material having high corrosion resistance and mainly includes the inflow pipe 21 and a case (inner case) 22. The case 22 is provided inside the second case 12, and the inflow pipe 21 guides the oil to the internal space of the case 22. The inflow pipe 21 and the case 22 are disposed in different positions in the height direction.

The case 22 is a member having a bottomed substantially cylindrical shape with a side surface 22a adjoining to the second case 12. An opening 22c is formed in an upper end surface 22b of the case 22. Also, at the upper end surface 22b, a cylindrical portion 22d protruding upward (+z direction) is provided around the opening 22c.

Figure 3:
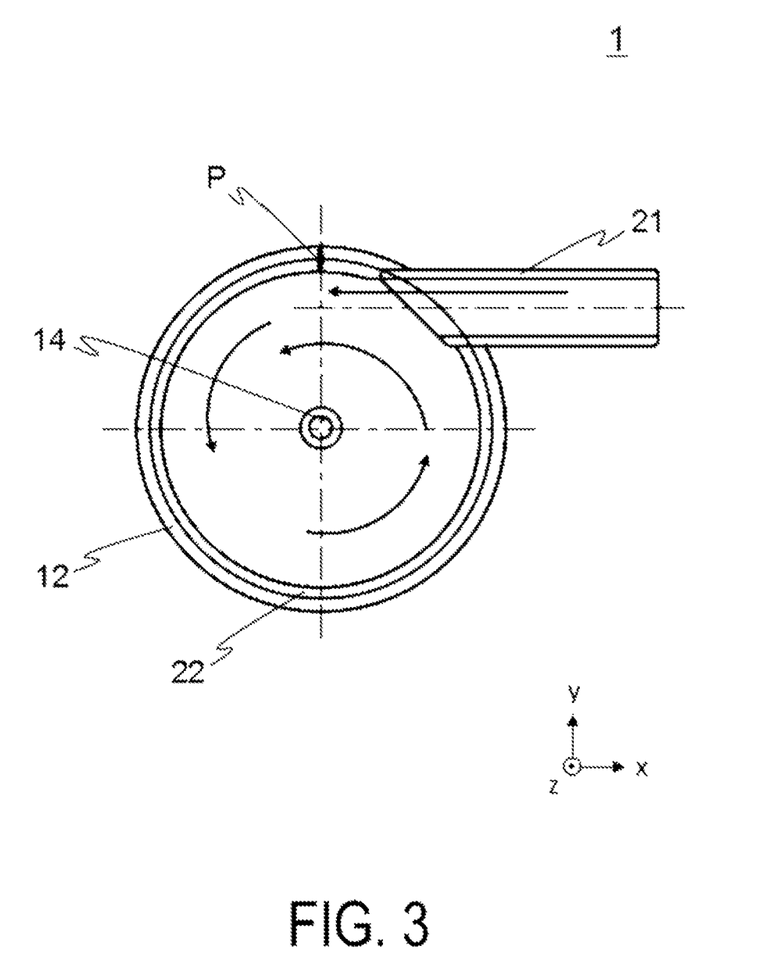
FIG. 3 is a cross-sectional view along A-A in FIG. 2.

FIG. 3 is a cross-sectional view along A-A in FIG. 2 (note that hatching indicating a cross section is omitted). The inflow pipe 21 is configured to allow the hydraulic oil to flow into the case 22 from a tangential direction at any point P on the side surface of the second case 12 and the case 22. As a result, the hydraulic oil that flowed into the inflow pipe 21 swirls in the inside of the case 22, as illustrated by the arrows in FIG. 3. The inflow pipe 21 is provided substantially along the outer periphery of the second case 12 and the case 22, whereby the hydraulic oil flows while gradually swirling from an outer periphery to an inner side of the case 22. When a swirling flow is thus produced in the hydraulic oil, the bubbles contained in the hydraulic oil are collected in the center portion of the swirling flow.

Note that "substantially along" is not limited to being strictly along the outer periphery and is a concept that includes, for example, cases where the position of the inflow pipe 21 is shifted by a small amount (about a few mm, for example) with respect to the second case 12 and the case 22 but can be considered equivalent to being along the outer periphery. The case illustrated in FIG. 3 is also included in "substantially along the second case 12 and the case 22."

The description will now return to FIG. 2. The filter element 30 is a member having a substantially cylindrical shape provided in the filter case 10. The filter element 30 mainly includes an inner tube 31, a filtration material 32, an outer tube 33, and plates 34, 35.

The inner tube 31 and the outer tube 33 are members that have substantially hollow cylindrical shapes and include openings at both ends. The inner tube 31 and the outer tube 33 are formed using a material having high corrosion resistance (a metal such as stainless steel or a resin, for example), and holes through which the hydraulic oil passes are formed substantially across the entire region thereof.

The filtration material 32 is configured to filter the hydraulic oil that has passed through the bubble removing portion 20 and has a substantially cylindrical shape with thickness in a radial direction. A height of the filtration material 32 is substantially the same as a height of the inner tube 31 and the outer tube 33. The filtration material 32 is formed by pleating a filter paper based on a synthetic resin, paper, or the like, and connecting both ends of the pleated filter paper to form a cylindrical shape.

The plate (first plate) 34 is provided to respective first ends of the inner tube 31, the filtration material 32, and the outer tube 33 and the plate (second plate) 35 is provided to respective second ends. The plate 34 and the plate 35 are members having a substantially circular plate shape or a bottomed substantially cylindrical shape and are formed from a resin or a metal. The plate 34 and the plate 35 are provided so as to cover the openings formed at the ends of the inner tube 31, the outer tube 33, and the filtration material 32.

The plate 34 covers the upper ends of the inner tube 31, the filtration material 32, and the outer tube 33. The tube portion 13a of the lid body 13 is fitted to an inner peripheral surface 34a of the plate 34. The inner peripheral surface 34a and the tube portion 13a are sealed by a sealing member 41 such as a gasket.

The plate 35 covers lower ends of the inner tube 31, the filtration material 32, and the outer tube 33. The cylindrical portion 22d is fitted to an inner peripheral tube 35a of the plate 35. Thus, the filter element 30 is attached to the case 22 and the internal space of the case 22 and a hollow portion of the inner tube 31 (a hollow portion of the filter element 30) are in communication. The inner peripheral tube 35a and the cylindrical portion 22d are sealed by a sealing member 42 such as a gasket.

Next, the functionality of the return filter 1 thus configured will be described. The arrows in FIG. 2 indicate the flow of the hydraulic oil in the inside of the return filter 1.

The hydraulic oil that flowed from the inflow pipe 21 flows into the second case 12 and the case 22. The hydraulic oil that flowed is configured to flow upward while swirling. A swirling flow is produced in the hydraulic oil, causing the air (small bubbles) contained in the hydraulic oil to collect in the center portion of the swirling flow and become large bubbles B. Thus, the bubbles contained in the hydraulic oil are configured to be removed by the bubble removing portion 20.

The inflow pipe 21 is positioned so as not to overlap the filter element 30 in the height direction. In the present embodiment, the inflow pipe 21 is positioned on a lower side (−z side) of the filter element 30, whereby the hydraulic oil from which the bubbles have been removed, flows upward while swirling (±z direction) and flows into the hollow portion of the inner tube 31 from the case 22. The hydraulic oil that flowed into the hollow portion of the inner tube 31 is temporarily retained in the hollow portion of the inner tube 31. At this time, an oil surface S' is raised to the vicinity of the tube portion 13a.

After that, the hydraulic oil temporarily retained in the hollow portion of the inner tube 31 passes from the inside to the outside of the filtration material 32 and then flows out to a space between the outer tube 33 and the first case 11 through a through hole formed in the outer tube 33. After that, the hydraulic oil passes through the through hole 11a and flows out from the return filter 1 to the inside of the hydraulic oil tank 100.

In the bubble removing portion 20, the bubbles B produced in the center portion in a swirling flow come up to the oil surface, disappear at the oil surface as indicated by double dashed arrow in FIG. 2, and then are released to the outside of the return filter 1 through the air outlet hole 13b.

As illustrated in FIG. 1, the air outlet hole 13b has the first end 13c open to the internal space of the filter element 30 (inner tube 31) and the second end 13d open to a space above the oil surface S of the hydraulic oil tank 100. Thus, the bubbles B removed from the hydraulic oil at the return filter 1 are released to a space above the oil surface S inside the hydraulic oil tank 100 and are not mixed into the hydraulic oil retained in the hydraulic oil tank 100.

According to the present embodiment, the bubbles B removed inside the return filter 1 are not released into the filtered hydraulic oil retained in the hydraulic oil tank 100, making it possible to prevent any defects that will occur if the pump takes in air. In addition, an occurrence of damage and the like resulting from the bubbles bursting inside the hydraulic circuit or the like, which causes the temperature and the pressure of the hydraulic oil to temporarily increase to a significant degree, may be prevented.

Note that in the present embodiment, the position of the oil surface S' at the time of filtering the hydraulic oil through the return filter 1 is lower than a tip end of the tube portion 13a, but considering the possibility of the oil surface S' being in contact with the tube portion 13a, a check valve can be provided inside the air outlet hole 13b.

Second Embodiment

While the bubble removing portion 20 is provided on the lower side of the filter element 30 according the first embodiment, the position of the bubble removing portion is not limited thereto.

According to the second embodiment, the bubble removing portion is provided to the upper side (+z side) of the filter element. Below, a description is given of a return filter 2 according to the second embodiment. Note that the same components as those in the first embodiment are denoted using the same reference numerals, and descriptions thereof will be omitted.

Figure 4:
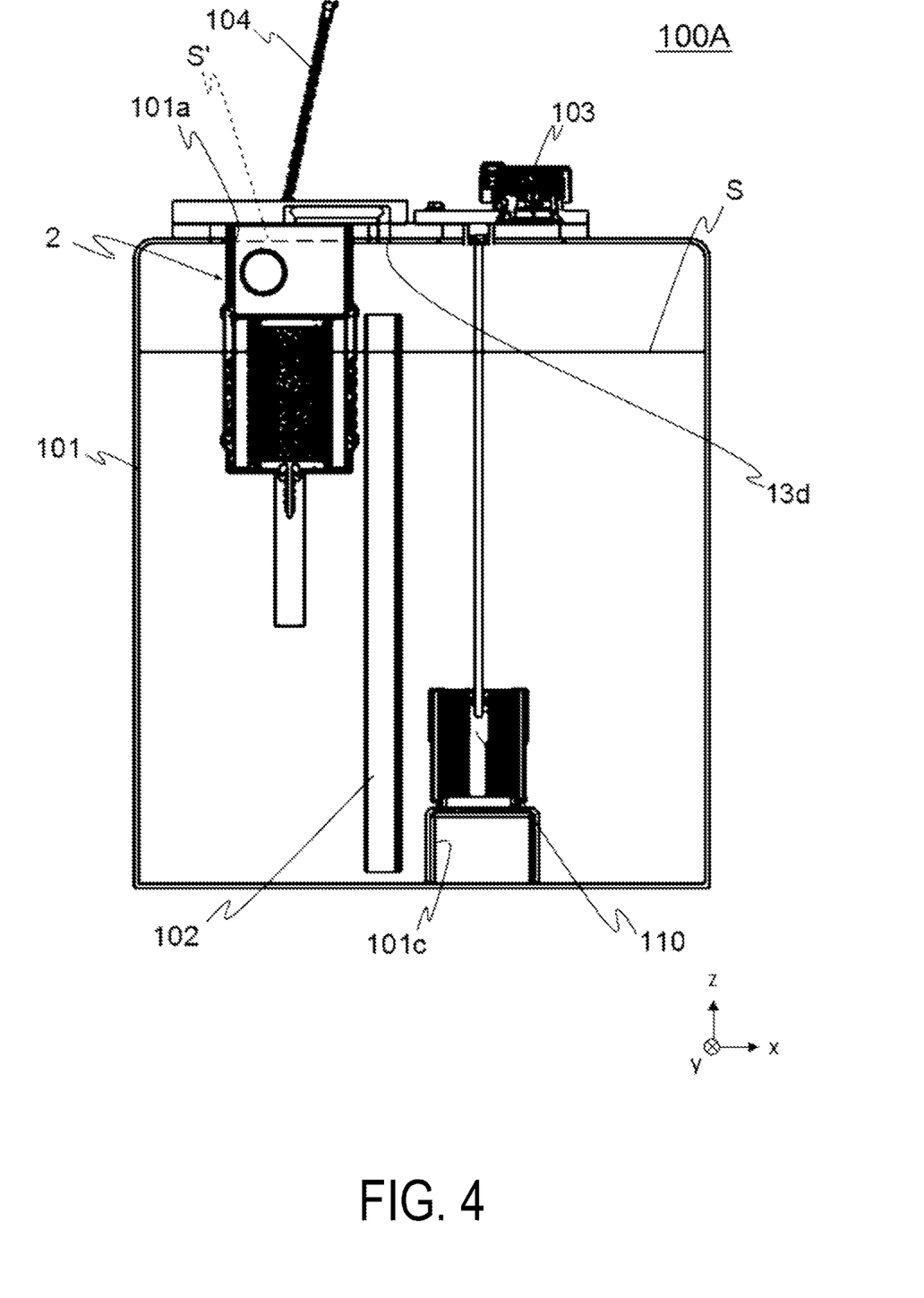
FIG. 4 is a diagram illustrating an overview of a hydraulic oil tank 100A provided, therein, with a return filter 2 according to the second embodiment of the present invention.

FIG. 4 is a diagram illustrating an overview of a hydraulic oil tank 100A provided, therein, with the return filter 2. The return filter 2 is attached to the opening 101a formed at an upper surface of the tank main body 101.

Figure 5:
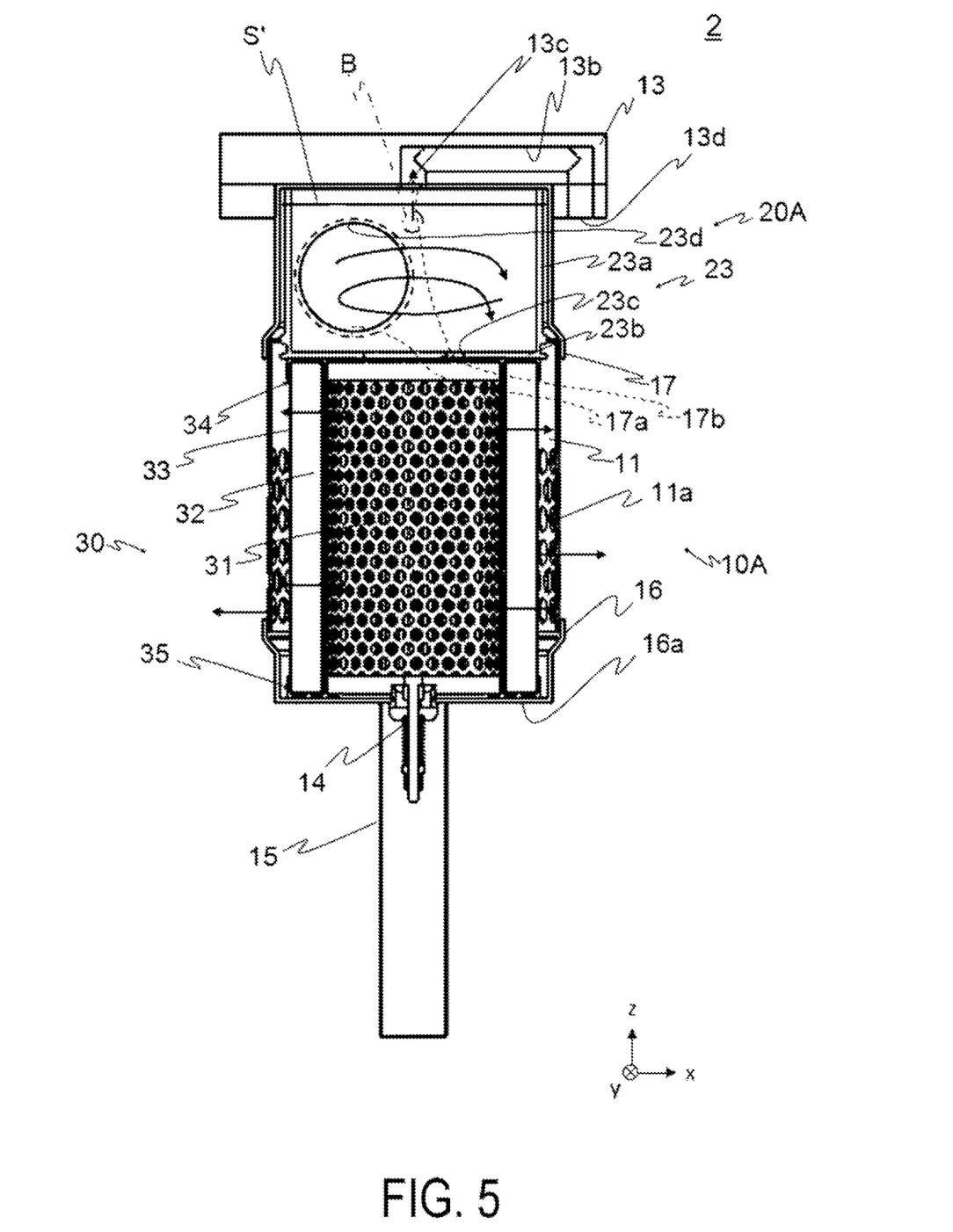
FIG. 5 is a cross-sectional view illustrating an overview of a return filter 2.

Further, FIG. 5 is a cross-sectional view illustrating an overview of the return filter 2 (note that hatching indicating a cross section is omitted). The return filter 2 mainly includes the filter case 10A, a bubble removing portion 20A and the filter element 30.

The filter case 10A is a member having a substantially cylindrical shape and covered at both ends and is formed from a material having high corrosion resistance (a metal such as stainless steel, or a resin, for example). The filter case 10A mainly includes the first case 11, a lower case 16 covering an opening on the lower side (−z side) of the first case 11, an upper case 17 covering an opening on the upper side (+z side) of the first case 11, and the lid body 13.

The lower case 16 is a member having a bottomed substantially cylindrical shape, and the valve 14 is provided at a bottom surface 16a. Also, at the bottom surface 16a, the cylindrical pipe 15 is provided to cover the valve 14.

The upper case 17 is a member having a bottomed substantially cylindrical shape, and the lid body 13 is provided at a bottom surface. At the side surface of the upper case 17, an opening 17a in which the inflow pipe 21 is provided, is formed. Further, at the bottom surface of the upper case 17, a hole 17b communicating with the air outlet hole 13b is formed. Note that a shape of the upper case 17 is not limited to a bottomed substantially cylindrical shape, and can be, for example, a substantially cylindrical shape.

The bubble removing portion 20A mainly includes the inflow pipe 21 (not illustrated in FIG. 5), and a case (inner case) 23. The case 23 is provided inside the upper case 17. The inflow pipe 21 and the case 23 are disposed in different positions in the height direction.

The case 23 is a member having a bottomed substantially cylindrical shape with a side surface 23a adjoining to the upper case 17. At the side surface 23a, an opening 23d in which the inflow pipe 21 is provided is formed. The inflow pipe 21 is configured to allow the hydraulic oil to flow into the case 23 from a tangential direction at any point P (not illustrated in FIG. 5) on the side surface of the upper case 17 and the case 23. Thus, a swirling flow is produced in the hydraulic oil, and the bubbles contained in the hydraulic oil are collected in the center portion of the swirling flow.

At the bottom surface 23b, a hole 23c is formed, which communicates between the internal space of the case 23 and the hollow portion of the inner tube 31 (i.e., the hollow portion of the filter element 30). The plate 34 of the filter element 30 comes into contact with the bottom surface 23b. The plate 35 of the filter element 30 comes into contact with the bottom surface 16a of the lower case 16, and the filter element 30 is held inside the filter case 10A by the bottom surface 23b and the bottom surface 16a.

Next, the functionality of the return filter 2 thus configured will be described. The arrows in FIG. 5 indicate the flow of the hydraulic oil in the return filter 2.

The inflow pipe 21 is positioned not to overlap the filter element 30 in the height direction. In the present embodiment, the inflow pipe 21 is disposed on an upper side of the filter element 30, whereby the hydraulic oil that flowed from the inflow pipe 21 first flows into the hollow portion of the inner tube 31 and begins to accumulate inside the case 23. As illustrated in FIG. 5, when the oil surface S' comes up higher than the opening 17a and the opening 23d (the hydraulic oil covers the opening 17a and the opening 23d), the hydraulic oil that flowed from the inflow pipe 21 begins to swirl inside the case 23. As a result, the bubbles (small bubbles) contained in the hydraulic oil collect in the center portion of the swirling flow, and grow to the large bubbles B.

The hydraulic oil from which the bubbles B have been removed in the case 23 flows downward (−z direction) while swirling, into the hollow portion of the inner tube 31 from the case 23 through the hole 23c. The hydraulic oil that flowed into the hollow portion of the inner tube 31 passes from the inside to the outside of the filtration material 32 and flows out to a space between the outer tube 33 and the first case 11 from the through hole formed in the outer tube 33. After that, the hydraulic oil passes the through hole 11a and flows out from the return filter 2 into the hydraulic oil tank 100A.

The bubbles B come up to the oil surface as indicated by double dashed arrow in FIG. 5 and disappear at the oil surface. Then, as illustrated in FIG. 4, the bubbles B are released to a space above the oil surface S in the hydraulic oil tank 100A through the air outlet hole 13b. Hence, the bubbles B are not mixed into the hydraulic oil retained in the hydraulic oil tank 100A.

According to the present embodiment, the bubble removing portion 20A is provided on the upper side of the filter element 30, making it possible to further reduce the possibility of the bubbles B passing the filtration material 32 together with the hydraulic oil.

Third Embodiment

In the first embodiment of the present invention, the bubbles B pass the air outlet hole 13b and are released to a space above the oil surface in the hydraulic oil tank 100, but the way to release the bubbles B into the space above the oil surface in the hydraulic oil tank 100 is not limited thereto.

The third embodiment provides such a form that bubbles are released by use of a pipe. A return filter 3 according to the third embodiment will be described below. Note that the same components as those in the first embodiment are denoted using the same reference numerals, and descriptions thereof will be omitted.

Figure 6:
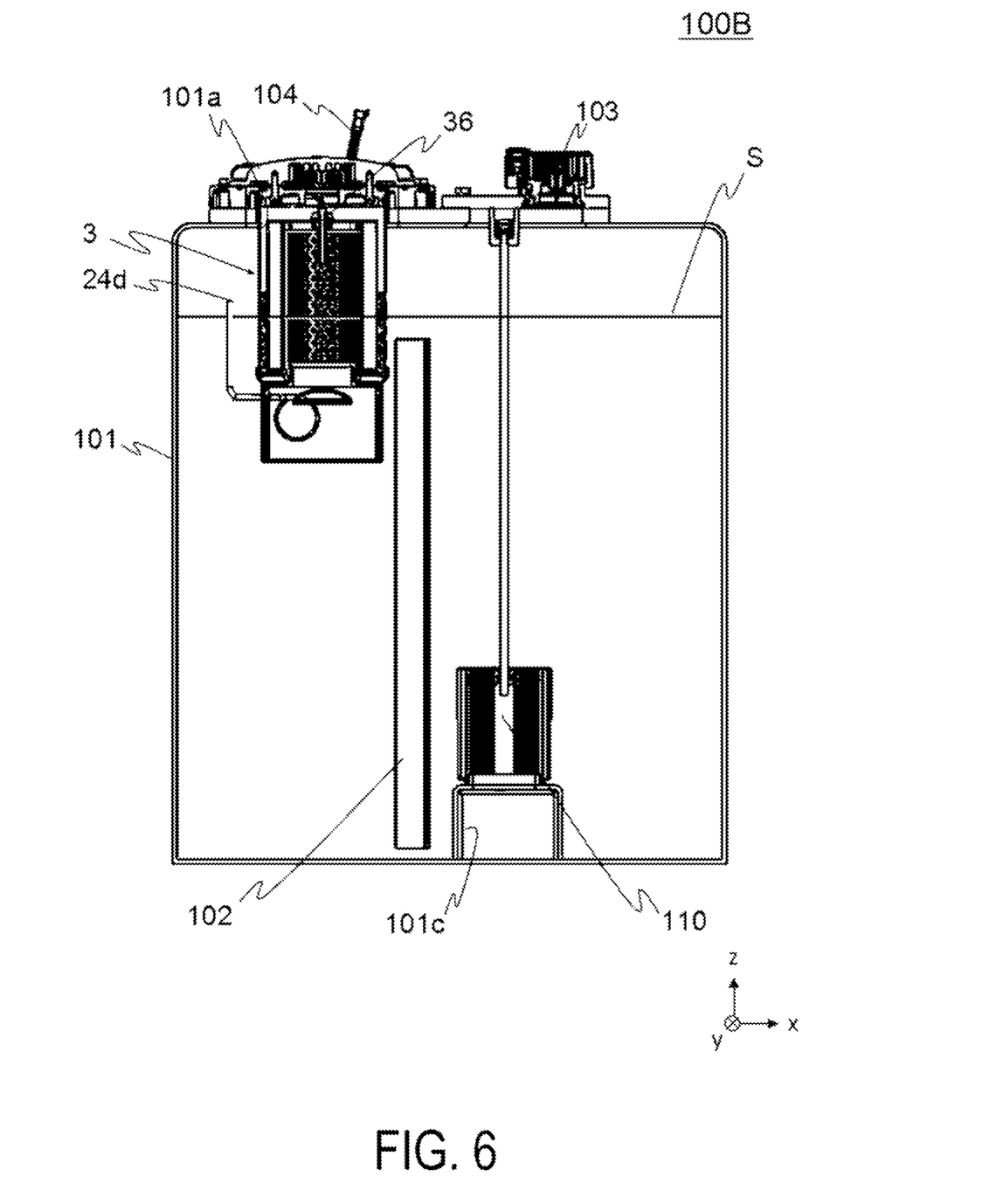
FIG. 6 is a diagram illustrating an overview of a hydraulic oil tank 100B provided, therein, with a return filter 3 according to the third embodiment of the present invention.

FIG. 6 is a diagram illustrating an overview of a hydraulic oil tank 100B provided, therein, with the return filter 3. The return filter 3 is attached to the opening 101a formed in the upper surface of the tank main body 101.

Figure 7:
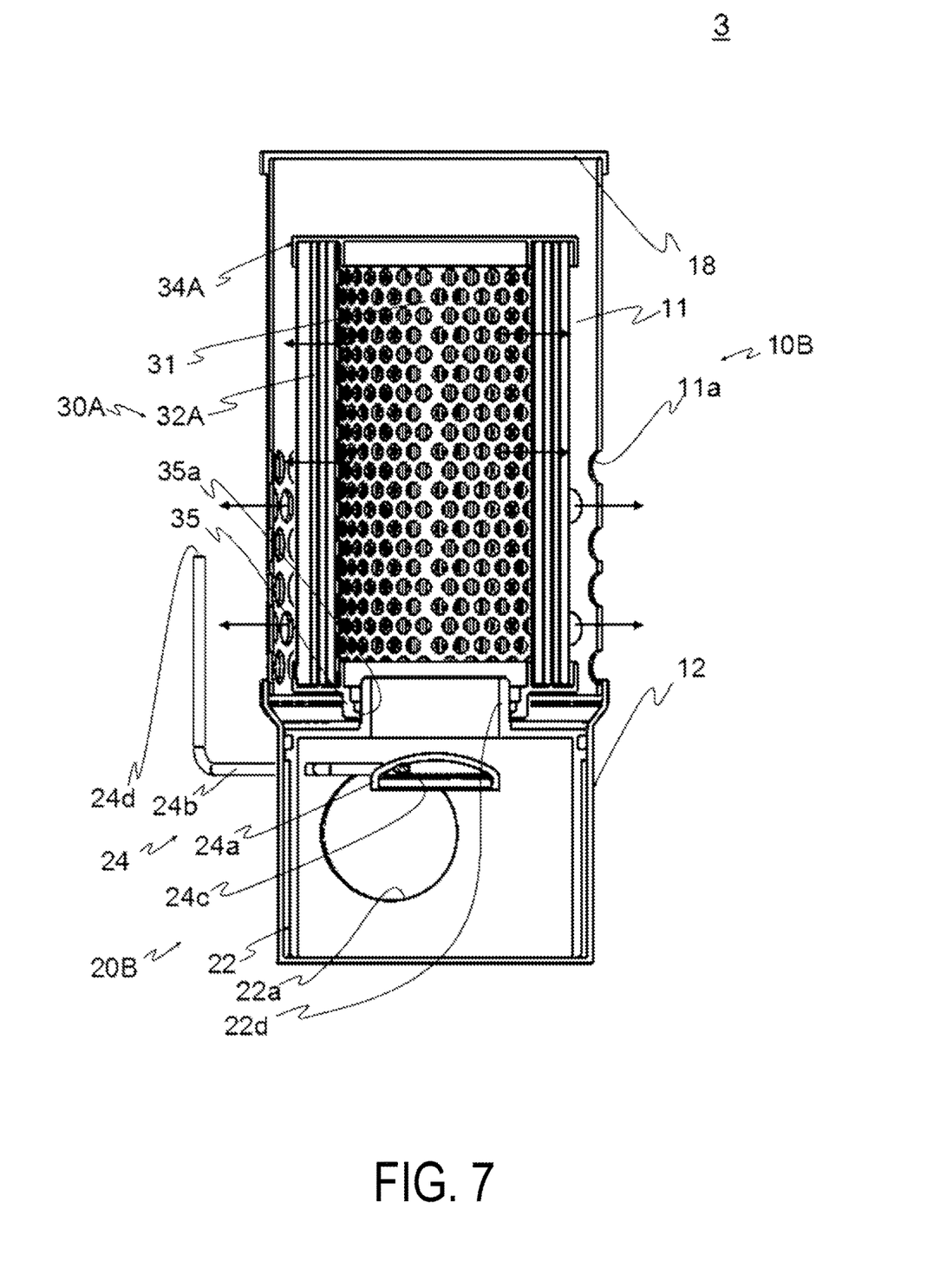
FIG. 7 is a cross-sectional view illustrating an overview of the return filter 3 according to the third embodiment.

Further, FIG. 7 is a cross-sectional view illustrating an overview of the return filter 3 (note that hatching indicating a cross section is omitted). The return filter 3 mainly includes a filter case 10B, a bubble removing portion 20B, and a filter element 30A.

The filter case 10B is a member having a substantially cylindrical shape and covered at both ends and mainly includes the first case 11, the second case 12, and a lid body 18 covering an opening at an upper end of the first case 11.

The bubble removing portion 20B mainly includes the inflow pipe 21 (not illustrated in FIG. 7), the case 22, and a bubble releasing portion 24. The inflow pipe 21 causes hydraulic oil to flow in the inside of the filter case 22 from the tangential direction at any point P (not illustrated in FIG. 7) on the side surface of the second case 12 and the case 22 as in the first embodiment. As a result, a swirling flow is produced in the hydraulic oil, and the bubbles contained in the hydraulic oil are collected in the center portion of the swirling flow.

The bubble releasing portion 24 is a member formed from, for example, a metal or a resin, and includes a howl-like bubble retaining portion 24a that retains the bubbles collected in the center portion of the swirling flow and an air outlet pipe 24b (corresponding to an air outlet portion) provided at the bubble retaining portion 24a.

The bubble retaining portion 24a is provided inside the second case 12 and the case 22. The bubble retaining portion 24a is disposed on the upper side of the inflow pipe 21. In the present embodiment, the bubble retaining portion 24a is positioned between the inflow pipe 21 and the filter element 30 in the height direction. Note that the shape of the bubble retaining portion 24a is not limited to the bowl shape but can be, for example, a substantially plate-like shape. The air outlet pipe 24b is provided passing through the side surface of the second case 12 and the case 22 with a first end 24c open on the lower side of the bubble retaining portion 24a and a second end 24d open to a space above the oil surface S in the hydraulic oil tank 100B (see FIG. 6).

The filter element 30A is attached to the cylindrical portion 22d of the case 22. Thus, the hydraulic oil from which the bubbles have been removed flows into the internal space of the filter element 30A from the case 22.

The filter element 30A mainly includes the inner tube 31, a filtration material 32A, the outer tube 33, plates 34A, 35, and the valve 33 (see FIG. 6). The filtration material 32A is obtained with a combination of a plurality of filtration materials formed by pleating a filter paper and connecting both ends of the pleated filter paper to form a cylindrical shape. The plate 34A is provided to cover the entire upper end of the inner tube 31, the filtration material 32A, and the outer tube 33. At the center portion of the plate 34A, a valve 36 (not illustrated in FIG. 7) that opens and closes depending on a difference between the internal pressure and the external pressure of the filter element 30A is provided.

Next, the functionality of the return filter 3 thus configured will be described. The arrows in FIG. 7 indicate the flow of the hydraulic oil in the return filter 3.

The bubbles B collected in the center portion of the swirling flow are retained in the bubble retaining portion 24a and released to the outside of the return filter 3 through the air outlet pipe 24b. As illustrated in FIG. 6, the bubbles B are released to a space above the oil surface S in the hydraulic oil tank 100B through the air outlet pipe 24b, whereby the bubbles B are not mixed into the hydraulic oil retained in the hydraulic oil tank 100B.

According to the present embodiment, it is possible to prevent bubbles from being released into the filtered hydraulic oil retained in the hydraulic oil tank 100. Also, no bubbles pass the inside of the filter element 30A and thus, the possibility of the bubbles B passing the filtration material 32 together with the hydraulic oil can be further reduced.

Note that in the present embodiment, the air outlet pipe 24b has the first end 24c exposed to the lower side of the bubble retaining portion 24a and the second end 24d exposed to a space above the oil surface S in the hydraulic oil tank 100, but the position of the second end 24d is not limited thereto, and, for example, the second end 24d may be positioned in the vicinity of the oil surface S of the hydraulic oil tank 100 and below the oil surface S. This is because provided that the bubbles B are released to the vicinity of the oil surface S, the bubbles B are less likely to be sucked into the strainer in accordance with the flow of the hydraulic oil in the hydraulic oil tank 100. Note that in order to surely prevent any defect occurring when the pump takes in air, it is desired that the air outlet pipe be exposed to a space above the oil surface S in the hydraulic oil tank 100.

Fourth Embodiment

Further, while according to the first embodiment, the hydraulic oil is made to flow into the case 22 from the tangential direction at any point P of the side surface of the second case 12 and the case 22, producing a swirling flow in the hydraulic oil, the way to produce a swirling flow in the hydraulic oil is not limited thereto.

The fourth embodiment provides such a form that a swirling flow is produced by the use of a rib. Below, a description is given of a return filter 4 according to the fourth embodiment. Note that the same components as those in the first embodiment are denoted using the same reference numerals, and descriptions thereof will be omitted.

Figure 8:
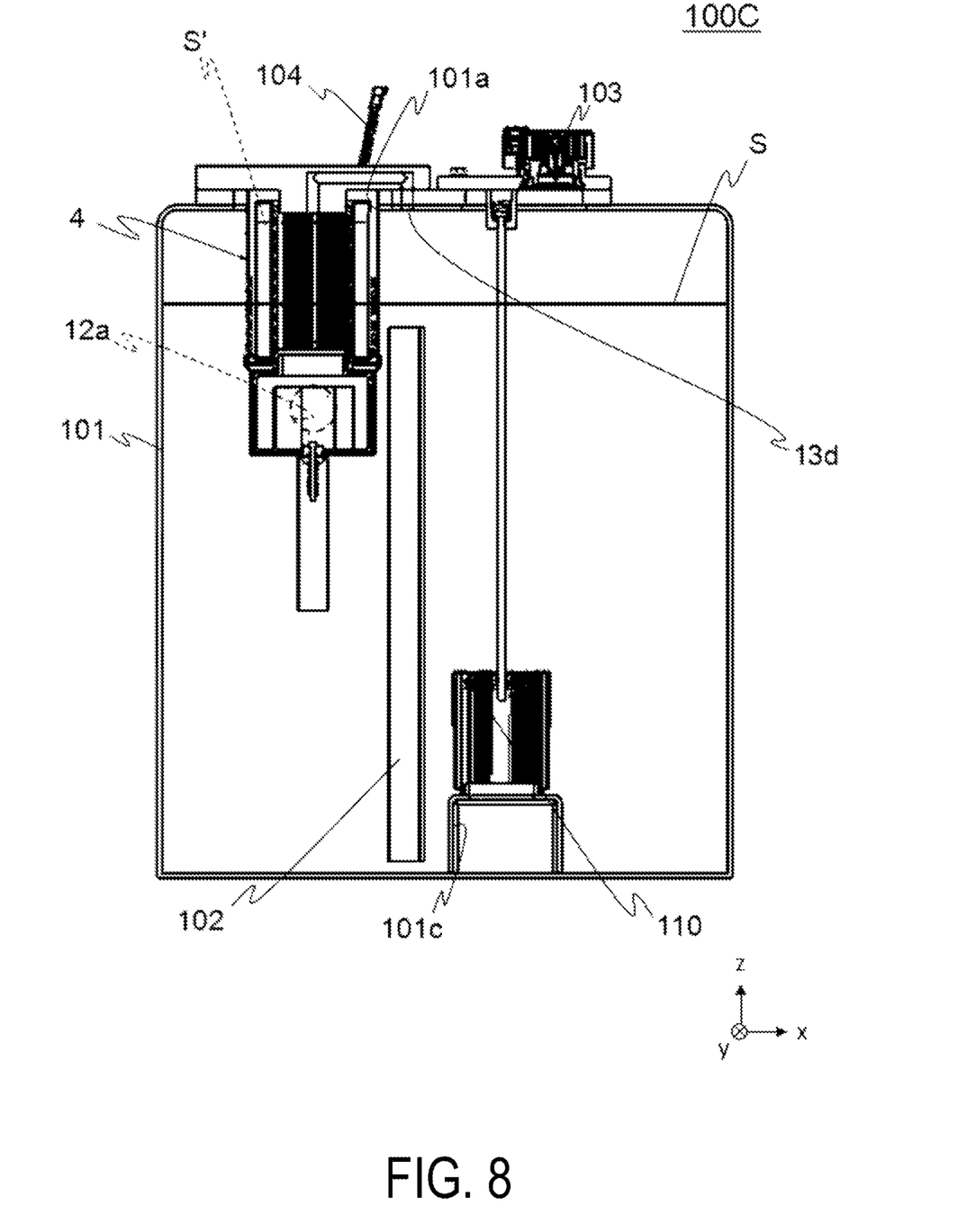
FIG. 8 is a diagram illustrating an overview of a hydraulic oil tank 100C provided, therein, with a return filter 4 according to the fourth embodiment of the present invention.

FIG. 8 is a diagram illustrating an overview of a hydraulic oil tank 100C provided, therein, with the return filter 4. The return filter 4 is attached to the opening 101a formed in the upper surface of the tank main body 101.

Figure 9:
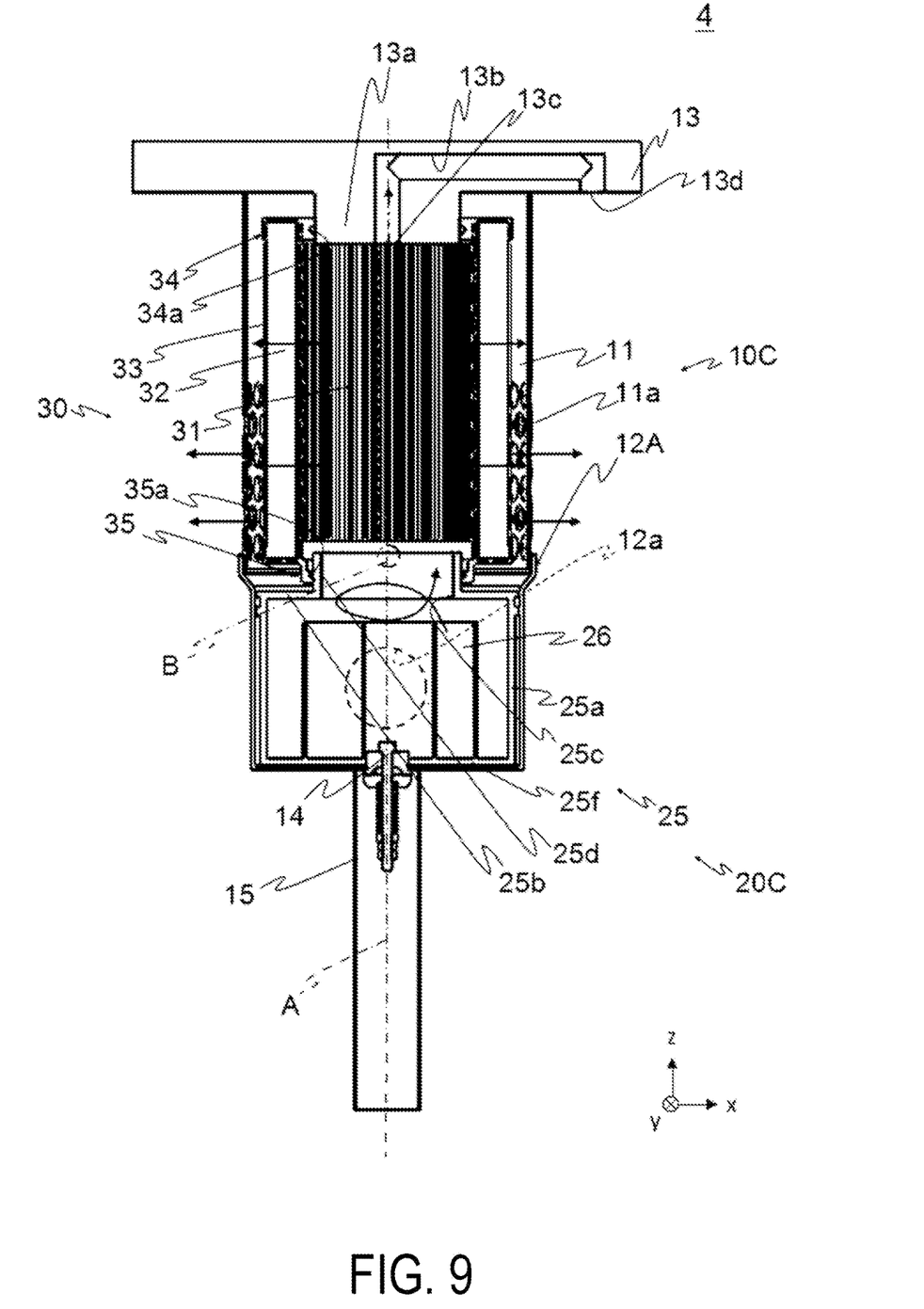
FIG. 9 is a cross-sectional view illustrating an overview of a return filter 4.

Further, FIG. 9 is a cross-sectional view illustrating an overview of the return filter 4 (note that hatching indicating a cross section is omitted). The return filter 4 mainly includes a filter case 10C, a bubble removing portion 20C, and the filter element 30.

The filter case 10C is a member having a substantially cylindrical shape and covered at both ends and mainly includes the first case 11 having a substantially cylindrical shape, a second case 12A, and the lid body 13. The second case 12 and the second case 12A only differ in position of the opening 12a in which the inflow pipe 21 is to be provided. In the second case 12A, the opening 12a is formed in such a position that the center axis of the opening 12a crosses the center axis A of the second case 12.

The bubble removing portion 20C mainly includes the inflow pipe 21 (not illustrated in FIG. 9), a case (inner case) 25, and a rib 26. The case 25 has a bottomed substantially cylindrical shape and is provided inside the second case 12A. The inflow pipe 21 and the case 25 are positioned to overlap each other in the height direction.

The case 25 is a member having a bottomed substantially cylindrical shape with a side surface 25a adjoining to the second case 12. At the side surface 25a, an opening 25e (see FIG. 10) in which the inflow pipe 21 is to be provided is formed. The hydraulic oil is guided to the internal space of the case 25 through the inflow pipe 21. In the present embodiment, the center axis of the inflow pipe 21 is substantially orthogonal to the center axis A.

At an upper end surface 25b of the case 25, an opening 25c is formed. Further, at the upper end surface 25b, a cylindrical portion 25d protruding upward is provided around the opening 25c. At the cylindrical portion 25d, the filter element 30 is provided.

Figure 10:
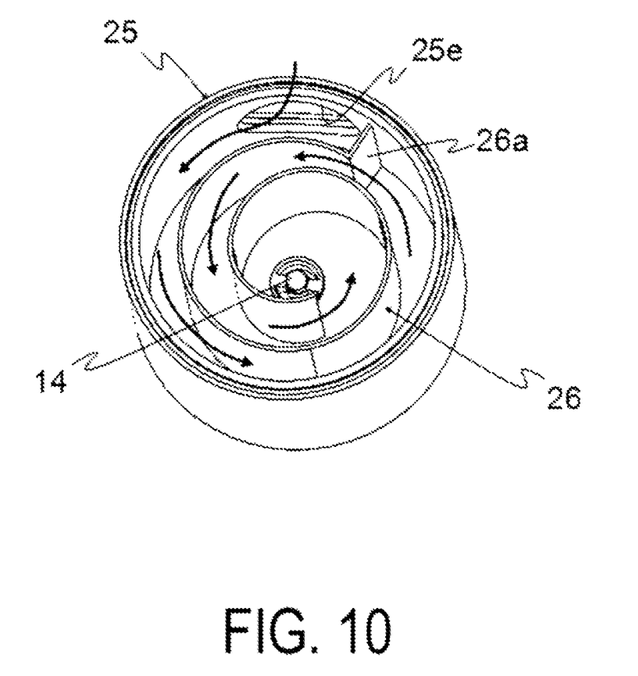
FIG. 10 is a perspective view illustrating overviews of a case 25 and a rib 26.

The rib 26 is formed from a material having high corrosion resistance and provided inside the case 25. FIG. 10 is a perspective view illustrating an overview of the case 25 and the rib 26. The rib 26 is obtained by curling a plate-like member into a swirl in a surface direction thereof. An outer end 26a of the rib 26 is positioned to cover the opening 25e, whereby regardless of the direction of the center axis of the inflow pipe 21 (direction of a flow of the hydraulic oil flowing into the case 25), the hydraulic oil that flowed from the inflow pipe 21 stops at the rib 26 and then, flows along the rib 26. As a result, the hydraulic oil that flowed from the inflow pipe 21 is configured to swirl inside the case 25, as illustrated by the arrows in FIG. 10.

The description will now return to FIG. 9. The lower end surface of the rib 26 comes into contact with a bottom surface 25f of the case 25, and the upper end surface of the rib 26 is positioned higher than the opening 12a and the opening 25e. Specifically, the rib 26 is positioned to overlap the inflow pipe 21 in the height direction. Thus, the hydraulic oil flows along the rib 26 to thereby surely produce a swirling flow. The inflow pipe 21 is positioned on the lower side of the filter element 30 and thus, the hydraulic oil flows upward while swirling, into the filter element 30 from the inside of the case 25.

According to the present embodiment, the provision of the rib 26 makes it possible to more reliably produce a swirling flow in the hydraulic oil. For example, in the case where the hydraulic oil is made to flow into the case 22 from the tangential direction at any point P on the side surface of the second case 12 and the case 22, if the hydraulic oil that flowed flows into the inflow pipe 21 at a low flow rate or in a small amount, the hydraulic oil may not possibly swirl. In contrast, in the case of providing the rib 26, even if the hydraulic oil flows at a low flow rate or in a small amount, the hydraulic oil can be made to swirl.

Note that in the present embodiment, the center axes of the opening 12a and the opening 25e cross the center axis A of the second case 12, and the center axis of the inflow pipe 21 is substantially orthogonal to the center axis A, but an installation position of the inflow pipe 21 and the direction of the center axis are not limited thereto. For example, the center axis of the inflow pipe 21 may be set along the tangential direction at any point of the rib 26.

Further, in the present embodiment, the rib 26 is obtained by curling the plate-like member into a swirl in the surface direction thereof, but the shape of the rib 26 is not limited thereto. Any shape can be adopted as long as a swirling flow is produced in the hydraulic oil as the hydraulic oil that flowed from the inflow pipe 21 into the second case 12 and the case 25 flows along the rib.

Embodiments of the invention have been described in detail with reference to the drawings, however, specific configurations are not limited to the embodiments, and changes in the design or the like are also included within a scope which does not depart from the gist of the invention. For example, the above examples have been explained in detail in order to facilitate understanding of the present invention and are not necessarily limited to examples provided with the entirety of the configuration described above. In addition, the configuration of an embodiment may be partially replaced with the configuration of a different embodiment, or the configuration of the different embodiment may be added to, deleted from, or replaced with the configuration of the embodiment.

Further, the term "substantially" in the present invention is not to be understood as merely being strictly the same and is a concept that includes variations and modifications to an extent that does not result in loss in identity. For example, the term "substantially orthogonal" is not limited to being strictly orthogonal and is a concept that includes variations of several degrees, for example. Further, simple expressions such as orthogonal, parallel, and identical are not to be understood as merely being strictly orthogonal, parallel, identical, and the like, and include being substantially parallel, substantially orthogonal, substantially matching, and the like.

Furthermore, the meaning of the term "vicinity" in the present invention includes a range of regions (which can be determined as desired) near a position serving as a reference. For example, the term "a vicinity of an end" refers to a range of regions near the end, and is a concept indicating that the end may or may not be included.

REFERENCE SIGNS LIST 1, 2, 3, 4: Return filter
10, 10A, 10B, 10C: Filter case
11: First case
11a: Through-hole
12, 12A: Second case
12a: Opening
13, 18: Lid body
13a: Tube portion
13b: Air outlet hole 13c: First end
13d: Second end
14: Valve
15: Cylindrical pipe
16: Lower case
16a: Bottom surface
17: Upper case
17a: Opening
17b: Hole
20, 20A, 20B, 20C: Bubble removing portion
21: Inflow pipe
22, 23, 25: Case
22a, 23a, 25a: Side surface
22b, 25b: Upper end surface
22c, 25c: Opening
22d, 25d: Cylindrical portion
23b: Bottom surface
23c: Hole
23d: Opening
24: Bubble releasing portion
24a: Bubble retaining portion
24b: Air outlet pipe
24c: First end
24d: Second end
25e: Opening
25f: Bottom surface
26: Rib
26a: End
30, 30A: Filter element
31: Inner tube
32, 32A: Filtration material
33: Outer tube
34, 34A: Plate
34a: Inner peripheral surface
35: Plate
35a: Inner peripheral tube
36: Valve
41, 42: Sealing member
100, 100A, 100B, 100C: Hydraulic oil tank
101: Tank main body
101a: Opening
101c: Outflow port
102: Partition plate
103: Air breather
104: Differential pressure indicator
110: Suction strainer

The invention claimed is:

1. A filter device provided inside a tank, comprising:
a filter case having a substantially cylindrical shape and covered at both ends;
a filter element provided inside the filter case and including
a filtration material having a substantially cylindrical shape,
a first plate covering an upper end of the filtration material, and
a second plate covering a lower end of the filtration material;
a bubble removing portion including
an inner case provided inside the filter case and
an inflow pipe provided at a side surface of the filter case so as not to overlap the filter element in a height direction and so as to overlap the inner case in the height direction, and configured substantially on a tangential line of an outer periphery of the filter case, so as to flow a liquid into the inner case and to produce a swirling flow in the flowed liquid in a circumferential direction along an inner peripheral surface of the inner case; and
an air outlet portion formed in an upper end surface or the side surface of the filter case with a first end open to an inside of the filter case and a second end open to a space above a liquid surface of a fluid retained inside the tank, wherein
an opening is formed in the second plate so as to cause the liquid to flow into a cylindrical hollow portion of the filter element from the inner case,
at the side surface of the filter case, a plurality of through holes in which a liquid having passed the filtration material flows out are formed,
air contained in the fluid is collected in a center portion of the swirling flow to generate bubbles, and the bubbles are released to a space above the liquid surface inside the tank through the air outlet portion,
the cylindrical hollow portion comprises an upper end opening at the first plate and a lower end opening at the second plate,
the first end open of the air outlet portion is configured to open toward a direction along a swirl center axis of the swirling flow,
in the filter device, the bubbles are guided in sequence to flow into the cylindrical hollow portion through the lower end opening, pass through the cylindrical hollow portion, flow out of the cylindrical hollow portion through the upper end opening, flow into the air outlet portion through the first end open, and flow out from the air outlet portion through the second end open.

2. The filter device according to claim 1, wherein the air outlet portion is formed in the upper end surface of the filter case.

3. The filter device according to claim 1, comprising a bubble retaining portion provided inside the filter case and disposed on an upper side of the inflow pipe, wherein
the air outlet portion has the first end open to a lower side of the bubble retaining portion.

4. The filter device according to claim 1, wherein the inner case comprises a cylindrical-shaped hollow inner space that is connected directly with the cylindrical hollow portion of the filter element.

5. A filter device provided inside a tank, comprising:
a filter case having a substantially cylindrical shape and covered at both ends;
a filter element provided inside the filter case and including
a filtration material having a substantially cylindrical shape,
a first plate covering an upper end of the filtration material, and
a second plate covering a lower end of the filtration material;
a bubble removing portion including
an inner case provided inside the filter case,
an inflow pipe provided at a side surface of the filter case so as not to overlap the filter element in a height direction and so as to overlap the inner case in the height direction, and
a rib provided inside the inner case so as to overlap the inflow pipe in the height direction, and configured to cause a liquid flowed inside the filter case from the inflow pipe to flow along the rib to produce a swirling flow in the liquid; and an air outlet portion formed in an upper end surface or the side surface of the filter case with a first end open to an inside of the filter case and a second end open to a space above a liquid surface of a fluid retained inside the tank, wherein an opening is formed in the first plate or the second plate so as to cause the liquid to flow into a cylindrical hollow portion of the filter element from the inner case, at the side surface of the filter case, a plurality of through holes in which a liquid having passed the filtration material flows out are formed, air contained in the fluid is collected in a center portion of the swirling flow to generate bubbles, and the bubbles are released to a space above the liquid surface inside the tank through the air outlet portion, the cylindrical hollow portion comprises an upper end opening at the first plate and a lower end opening at the second plate, the first end open of the air outlet portion is configured to open toward a direction along a swirl center axis of the swirling flow, in the filter device, the bubbles are guided in sequence to flow into cylindrical the hollow portion through the lower end opening, pass through the cylindrical hollow portion, flow out of the cylindrical hollow portion through the upper end opening, flow into the air outlet portion through the first end open, and flow out from the air outlet portion through the second end open.

6. The filter device according to claim 5, wherein the air outlet portion is formed in the upper end surface of the filter case.

7. The filter device according to claim 5, comprising a bubble retaining portion provided inside the filter case and disposed on an upper side of the inflow pipe, wherein the air outlet portion has the first end open to a lower side of the bubble retaining portion.

8. The filter device according to claim 5, wherein the inner case comprises a cylindrical-shaped hollow inner space that is connected directly with the cylindrical hollow portion of the filter element.

* * * * *